United States Patent
Fukuda et al.

(10) Patent No.: US 9,691,521 B2
(45) Date of Patent: Jun. 27, 2017

(54) RECTANGULAR INSULATED WIRE AND ELECTRIC GENERATOR COIL

(71) Applicants: Furukawa Electric Co., Ltd., Tokyo (JP); Furukawa Magnet Wire Co., Ltd., Chiyoda-ku (JP)

(72) Inventors: Hideo Fukuda, Tokyo (JP); Makoto Oya, Tokyo (JP); Keisuke Ikeda, Tokyo (JP); Satoko Yamoto, Tokyo (JP); Tsuneo Aoi, Tokyo (JP)

(73) Assignees: FURUKAWA ELECTRIC CO., LTD., Tokyo (JP); FURUKAWA MAGNET WIRE CO., LTD., Chiyoda-Ku (JP)

(*) Notice: Subject to any disclaimer, the term of this patent is extended or adjusted under 35 U.S.C. 154(b) by 0 days.

(21) Appl. No.: 15/181,475

(22) Filed: Jun. 14, 2016

(65) Prior Publication Data
US 2016/0307667 A1    Oct. 20, 2016

Related U.S. Application Data

(63) Continuation of application No. PCT/JP2014/080845, filed on Nov. 21, 2014.

(30) Foreign Application Priority Data

Jan. 10, 2014    (JP) .................... 2014-003719

(51) Int. Cl.
*H01B 7/02* (2006.01)
*H01B 3/30* (2006.01)
(Continued)

(52) U.S. Cl.
CPC ............ *H01B 7/0225* (2013.01); *B60L 11/02* (2013.01); *H01B 3/301* (2013.01); *H01B 3/306* (2013.01); *H01B 3/308* (2013.01); *H01B 3/36* (2013.01); *H01B 3/421* (2013.01); *H01B 7/0036* (2013.01); *H01B 7/0275* (2013.01); *H02K 3/02* (2013.01); *H02K 3/04* (2013.01); *H02K 3/30* (2013.01); *H02K 3/32* (2013.01)

(58) Field of Classification Search
CPC ..................................................... H01B 7/0225
USPC ..................................................... 174/110 A
See application file for complete search history.

(56) References Cited

U.S. PATENT DOCUMENTS

| | | | |
|---|---|---|---|
| 2006/0131059 A1 | 6/2006 | Xu et al. | |
| 2013/0037304 A1 | 2/2013 | Ikeda et al. | |
| 2013/0127038 A1 | 5/2013 | Ko et al. | |

FOREIGN PATENT DOCUMENTS

| | | |
|---|---|---|
| CN | 101080780 A | 11/2007 |
| CN | 103122221 A | 5/2013 |

(Continued)

OTHER PUBLICATIONS

Decision to Grant a Patent from Corresponding Application No. JP 2014-003719; Dated Sep. 26, 2016.
(Continued)

*Primary Examiner* — Timothy Thompson
*Assistant Examiner* — Stanley Tso (57) ABSTRACT

A rectangular insulated wire includes a rectangular conductor having a generally rectangular cross section, a thermosetting resin layer provided to cover the rectangular conductor, and a plurality of thermoplastic resin layers provided on the thermosetting resin layer. An adhesion strength between the thermosetting resin layer and the thermoplastic resin layer is 50 gf/mm to 100 gf/mm.

10 Claims, 1 Drawing Sheet

(51) Int. Cl.
  *H01B 3/42* (2006.01)
  *H02K 3/30* (2006.01)
  *B60L 11/02* (2006.01)
  *H01B 3/36* (2006.01)
  *H01B 7/00* (2006.01)
  *H02K 3/02* (2006.01)
  *H02K 3/04* (2006.01)
  *H02K 3/32* (2006.01)

(56) References Cited

FOREIGN PATENT DOCUMENTS

| | | | |
|---|---|---|---|
| JP | 2010-123390 A | 6/2010 | |
| JP | 2011-009200 A | 1/2011 | |
| JP | 2013-041700 A | 2/2013 | |

OTHER PUBLICATIONS

Office Action for Corresponding Application No. JP2014-003719; Dated Feb. 1, 2016.
International Search Report for Corresponding Application No. PCT/JP2014/080845; Dated Feb. 17, 2015.
Decision of Refusal for Corresponding Application No. JP2014-003719; Dated Apr. 18, 2016.
English Translation of Written Opinion for Corresponding Application No. PCT/JP2014/080845; Dated Feb. 17, 2015.
International Preliminary Report on Patentability for Corresponding Application No. PCT/JP2014/080845; Dated Jul. 12, 2016.
Office Action from Corresponding Application No. CN 201480072481.5; Dated Jan. 20, 2017.

F I G. 1A

F I G. 1B

RECTANGULAR INSULATED WIRE AND ELECTRIC GENERATOR COIL

CROSS REFERENCE TO RELATED APPLICATIONS

This is a continuation application of International Patent Application No. PCT/JP2014/080845 filed Nov. 21, 2014, which claims the benefit of Japanese Patent Application No. 2014-003719, filed Jan. 10, 2014, the full contents of all of which are hereby incorporated by reference in their entirety.

BACKGROUND

Technical Field

The present disclosure relates to an insulated wire obtained by coating a metal conductor with a resin, and particularly relates to an insulated wire used as a coil of an electric generator installed in, for example, electric power-driven vehicles.

Background Art

Conventionally, a round wire or a rectangular wire is employed as an insulated wire (magnet wire) used for a stator of an electric generator (motor generator) installed in automobiles. By employing a rectangular wire, a fill factor of the stator can be increased as compared to a case where a conductor having a generally round cross section is employed, and thus an electric generator having a reduced size and a higher power can be obtained. Recently, along with electric generators having a reduced size and higher power as described above, an insulated wire of the generator for vehicles is required to have properties, such as an insulating property, resistance to thermal softening, flexibility, and a long-term heat resistance, which are improved as compared to those of a conventional configuration.

In view of improving an insulating property, a so-called enameled wire having a rectangular conductor and an insulating layer of a thermosetting resin such as polyamide-imide (PAI) formed thereon is often used as a stator coil. However, an enamel coating alone does not provide sufficient reliability to high voltage. Accordingly, in order to improve the reliability to high voltage, attempts have been made to form another insulating layer on an outside of the enameled wire.

For example, some insulated wires have, on an outside of the enameled wire, another insulating layer formed of an amorphous resin such as polyethersulfone (PES). With this configuration, an insulating layer having excellent long-term heat resistance and insulating properties at a high voltage can be obtained. However, an amorphous resin such as PES is poor in chemical resistance. Therefore, when a coil is formed by winding an insulated wire and immersed into an impregnating varnish such as an epoxy resin, and thereafter, upon curing the impregnating varnish, the insulating layer formed of an amorphous resin is affected by the impregnating varnish and a crack tend to occur in the insulating layer.

In order to alleviate this, an insulated wire is proposed which is further provided with an insulating layer formed of a crystalline resin such as polyphenylene sulfide (PPS) or polyetheretherketone (PEEK) on an outside of the aforementioned insulating layer formed of an amorphous resin. With such a configuration, chemical resistance can be improved while maintaining the long-term heat resistance and the insulating property at a high voltage. However, the aforementioned configuration is poor in flexibility and resistance to thermal softening, since the crystalline resin such as PPS and PEEK has a small elongation and a low glass transition temperature. Furthermore, since a crystalline resin such as PPS and PEEK does not easily adhere to an amorphous resin such as PES, adhesion between these insulating layers is poor. Accordingly, a peeling occurs between the insulating layers in a bending process, which may result in a decrease in electrical characteristics.

Accordingly, an insulated wire has been proposed that has, on an outside of the enameled wire, a lower layer formed of PES and an upper layer formed on an outer surface of the lower layer, with the upper layer being formed of a polymer alloy of PES and PPS or of PES and PEEK (Japanese Laid-Open Patent Publication No. 2010-123390). By this configuration, since the upper layer is formed of a polymer alloy containing PES, adhesion with the lower layer formed of PES improves. Thus, occurrence of peeling between the upper layer and the lower layer which may occur in a bending process can be suppressed.

With the configuration in which the upper layer is formed of a polymer alloy, however, adhesion between the upper layer and the lower layer is greater than required. Accordingly, when the insulated wire is bent, a crack which extending from the insulating layer and reaching an outer surface of the conductor occurs, and thus it cannot be said that flex resistance reliability is sufficient. Further, recently, an electric generator disposed integrally with a transmission and configured to directly cool a heat generation portion using ATF (Automatic Transmission Fluid) retained in a motor case is being proposed as a vehicle electric generator. For insulated wires used for a coil of such electric generator, resistance to ATF is often required.

The present disclosure is related to providing a rectangular insulated wire having an improved flex resistance reliability by achieving both an improvement in adhesion between insulating layers and prevention of occurrence of a crack reaching a conductor, while maintaining flexibility and resistance to thermal softening, and further having an excellent ATF-resistant property, as well as an electric generator coil.

SUMMARY

The present inventors carried out assiduous studies to attain the above object, and as a result, reached the findings that, by forming a single or a plurality of thermoplastic resin layers on an enamel layer and specifying the range/ranges of relative crystallinity of the thermoplastic resin layer/layers formed on the enamel layer, adhesion between insulating layers and prevention of occurrence of a crack can be achieved together, and that, further, an excellent ATF-resistant property can be obtained. The present disclosure was made based on such findings.

That is to say, the present disclosure is achieved by the following aspects.

(First Aspect)

(1) A rectangular insulated wire comprising:

a rectangular conductor having a generally rectangular cross section;

a thermosetting resin layer provided to cover the rectangular conductor; and a plurality of thermoplastic resin layers provided on the thermosetting resin layer, an adhesion strength between the thermosetting resin layer and the thermoplastic resin layer being 50 gf/mm to 100 gf/mm.

(2) The rectangular insulated wire according to the aforementioned statement (1), wherein the thermoplastic resin layer is a crystalline resin layer formed of any of materials selected from the group comprising polyetheretherketone, polyetherketoneketone, polyetherketone, polyphenylene sulfide and thermoplastic polyimide.

(3) The rectangular insulated wire according to the aforementioned statements (1) or (2), wherein adhesion strengths between the plurality of thermoplastic resin layers are 50 gf/mm to 100 gf/mm, respectively.

(4) The rectangular insulated wire according to any one of the aforementioned statements (1) to (3), wherein the thermosetting resin layer is formed of one or a plurality of materials selected from the group comprising polyamide-imide, polyesterimide, polyimide, class H polyester and polyetherimide.

(5) The rectangular insulated wire according to the aforementioned (1), wherein the thermosetting resin layer is formed on the rectangular conductor by bake-on coating.

(6) The rectangular insulated wire according to the aforementioned statement
(1), wherein the plurality of thermoplastic resin layers comprises a first thermoplastic resin layer and a second thermoplastic resin layer provided on the first thermoplastic resin layer.

(7) The rectangular insulated wire according to the aforementioned statement (6), wherein the first thermoplastic resin layer is formed on the thermosetting resin layer by extrusion, and further, the second thermoplastic resin layer is formed on the first thermoplastic resin layer by extrusion.

(8) The rectangular insulated wire according to any one of the aforementioned statements (1) to (4), wherein the rectangular conductor is one of aluminum or aluminum alloy and copper or copper alloy.

(9) An electric generator coil formed by winding the rectangular insulated wire as claimed in any one of the aforementioned statements (1) to (8).

(Second Aspect)

(10) A rectangular insulated wire comprising:
a rectangular conductor having a generally rectangular cross section;
a thermosetting resin layer provided to cover the rectangular conductor; and a first thermoplastic resin layer provided on the thermosetting resin layer,
the first thermoplastic resin layer having a relative crystallinity of greater than or equal to 20% and less than or equal to 50%, the relative crystallinity being calculated based on heat of fusion and heat of crystallization measured by differential scanning calorimetry.

(11) The rectangular insulated wire according to the aforementioned statement (10), wherein the first thermoplastic resin layer is a crystalline resin layer formed of any of materials selected from the group comprising polyetheretherketone, polyetherketoneketone, polyetherketone, polyphenylene sulfide and thermoplastic polyimide.

(12) The rectangular insulated wire according to the aforementioned statement (10) or (11), wherein an adhesion strength between the thermosetting resin layer and the first thermoplastic resin layer is 50 gf/mm to 100 gf/mm.

(13) The rectangular insulated wire according to the aforementioned statement (12), further comprising a second thermoplastic resin layer provided on the first thermoplastic resin layer, the second thermoplastic resin layer having a relative crystallinity that is approximately the same as or greater than the relative crystallinity of the first thermoplastic resin layer,
wherein an adhesion strength between the first thermoplastic resin layer and the second thermoplastic resin layer is 50 gf/mm to 100 gf/mm.

(14) The rectangular insulated wire according to the aforementioned statement (13), wherein the relative crystallinity of the second thermoplastic resin layer is 45% to 100%, and
the relative crystallinity of the second thermoplastic resin layer is within a range of −5% to 60% with respect to the relative crystallinity of the first thermoplastic resin layer.

(15) The rectangular insulated wire according to the aforementioned statement (13) or (14), wherein the second thermoplastic resin layer is a second crystalline resin layer formed of any material selected from the group comprising polyetheretherketone, polyetherketoneketone, polyetherketone, polyphenylene sulfide and thermoplastic polyimide.

(16) The rectangular insulated wire according to any one of the aforementioned statements (10) to (15), wherein the thermosetting resin layer is formed of one or a plurality of materials selected from the group comprising polyamide-imide, polyesterimide, polyimide, class H polyester and polyetherimide.

(17) The rectangular insulated wire according to the aforementioned statement (10), wherein the thermosetting resin layer is formed on the rectangular conductor by bake-on coating.

(18) The rectangular insulated wire according to the aforementioned statement (10), wherein the first thermoplastic resin layer is formed on the thermosetting resin layer by extrusion, and further the second thermoplastic resin layer is formed on the first thermoplastic resin layer by extrusion.

(19) The rectangular insulated wire according to any one of the aforementioned statements (10) to (16), wherein the rectangular conductor is one of aluminum or aluminum alloy and copper or copper alloy.

(20) An electric generator coil formed by winding the rectangular insulated wire as claimed in any one of the aforementioned statements (10) to (19).

(Effect of First Aspect)

According to a rectangular insulated wire of the first aspect, a plurality of thermoplastic resin layers are formed on a thermosetting resin layer, and with an adhesion strength between the thermosetting resin layer and the thermoplastic resin layer being 50 gf/mm to 100 gf/mm, moderate adhesion can be obtained between the thermosetting resin layer and the thermoplastic resin layer, and occurrence of a crack extending from the thermoplastic resin layer and reaching an outer surface of the rectangular conductor can be prevented. Accordingly, both an improvement in adhesion and prevention of occurrence of a crack can be achieved by suppressing the adhesion strength between the thermosetting resin layer and the thermoplastic resin layer from increasing higher than required, and it is possible to improve flex resistance reliability. Also, since the thermoplastic resin layer is disposed at an outer most layer, it has an excellent chemical resistance and, particularly, an excellent ATF-resistant property.

Further, regarding the plurality of thermoplastic resin layers described above, an adhesion strength between a first thermoplastic resin layer and a second thermoplastic resin layer formed on the first thermoplastic resin layer is 50 gf/mm to 100 gf/mm. Thereby, moderate adhesion can be obtained between the first thermoplastic resin layer and the second thermoplastic resin layer, and thus it is possible to positively prevent an occurrence of a crack progressing from the second thermoplastic resin layer to the outer surface of the rectangular conductor. Also, it has an excellent scratch resistance.

(Effect of Second Aspect)

According to a rectangular insulated wire of the second aspect, the first thermoplastic resin layer is formed on the thermosetting resin layer, and the first thermoplastic resin layer has a relative crystallinity of greater than or equal to 20% and less than or equal to 50%, and preferably greater than or equal to 30% and less than or equal to 50%, the relative crystallinity being calculated based on heat of fusion and heat of crystallization measured by differential scanning calorimetry. Thereby, both an improvement in adhesion and prevention of occurrence of a crack can be achieved by suppressing the adhesion strength between the thermosetting resin layer and the first thermoplastic resin layer from increasing higher than required, while maintaining the flexibility and resistance to thermal softening, and it is possible to improve flex resistance reliability. Also, because the first thermoplastic resin layer is disposed at an outer most layer, it has an excellent chemical resistance and, particularly, an excellent ATF-resistant property.

Particularly, in a case where the adhesion strength between the thermosetting resin layer and the first thermoplastic resin layer is 50 gf/mm to 100 gf/mm, moderate adhesion can be obtained between the thermosetting resin layer and the first thermoplastic resin layer, and occurrence of a crack extending from the first thermoplastic resin layer and reaching an outer surface of the rectangular conductor can be prevented.

Further, in a case where a second thermoplastic resin layer is formed on the first thermoplastic resin layer, the second thermoplastic resin layer has a relative crystallinity which is approximately the same as or greater than the relative crystallinity of the first thermoplastic resin layer.

Accordingly, moderate adhesion can be also obtained between the first thermoplastic resin layer and the second thermoplastic resin layer, and an adhesion strength between the first thermoplastic resin layer and the second thermoplastic resin layer can be 50 gf/mm to 100 gf/mm. As a result, it is possible to positively prevent an occurrence of a crack progressing from the second thermoplastic resin layer to the outer surface of the rectangular conductor. Also, because of the second thermoplastic resin layer having a relative crystallinity which is approximately the same as or greater than the relative crystallinity of the first thermoplastic resin layer disposed at an outer most layer, occurrence of partial discharge can be suppressed, chemical resistance can be further improved, and also has an excellent scratch resistance.

Here, by providing an electric generator coil by winding rectangular insulated wires of the first aspect and the second aspect, occurrence of partial discharge be suppressed and chemical resistance can be further improved, and also an effect of an excellent scratch resistance can be ensured, and a rectangular insulated wire which is excellent in the above mentioned properties can be obtained.

BRIEF DESCRIPTION OF DRAWINGS

FIGS. 1A and 1B are diagrams schematically showing a configuration of a rectangular insulated wire according to an embodiment of the present disclosure, of which

DETAILED DESCRIPTION

Further features of the present disclosure will become apparent from the following detailed description of exemplary embodiments with reference to the accompanying drawings.

Figure 1A:
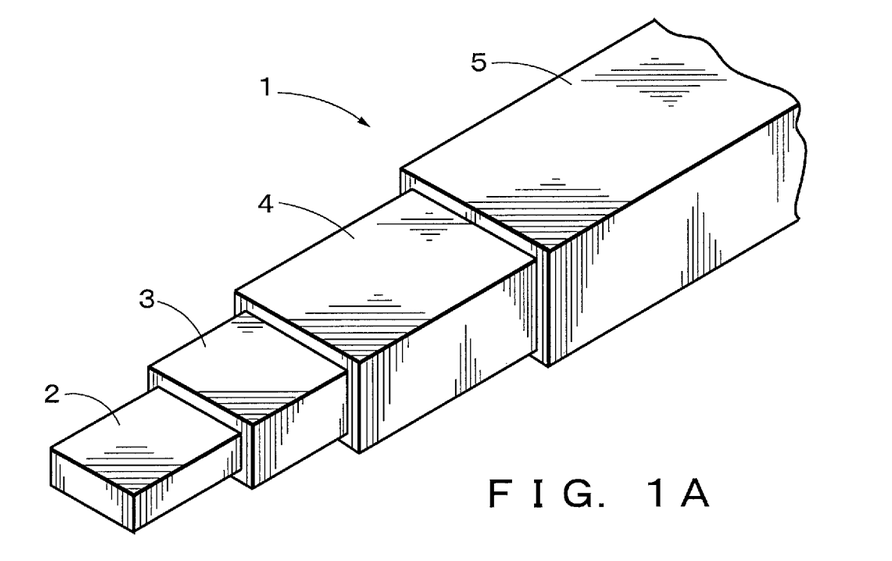
FIG. 1A is a perspective diagram and FIG. 1B is a partial cross-sectional view.
Figure 1B:
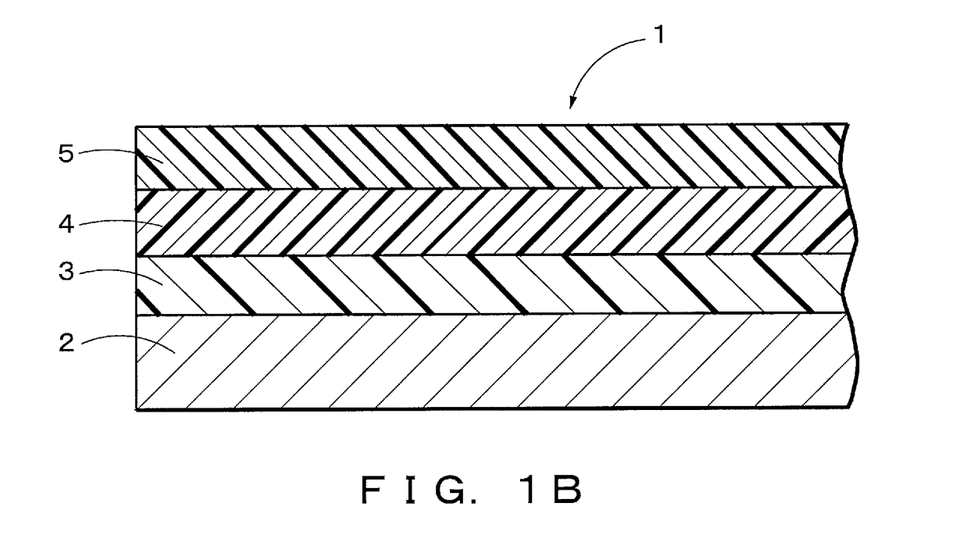

FIGS. 1A and 1B are diagrams schematically showing a configuration of a rectangular insulated wire according to an embodiment of the present disclosure, of which FIG. 1A is a perspective diagram and FIG. 1B is a partial cross-sectional view. Length, width and thickness of each configuration in FIGS. 1A and 1B are shown by way of example, and length, width and thickness of each configuration in the rectangular insulated wire of the present disclosure should not be limited to those illustrated in FIGS. 1A and 1B.

A rectangular insulated wire 1 shown in FIGS. 1A and 1B includes, as described above as the first aspect, a rectangular conductor 2 having a generally rectangular cross section, a thermosetting resin layer 3 formed to cover the rectangular conductor, a thermoplastic resin layer 4 formed to cover the thermosetting resin layer, and a thermoplastic resin layer 5 formed to cover the thermoplastic resin layer 4, and is further characterized in that an adhesion strength between a thermosetting resin layer and a first thermoplastic resin layer and an adhesion strength between a first thermoplastic resin layer and a second thermoplastic resin layer are controlled to be in a predetermined range. The second aspect includes, as coating layers, a thermosetting resin layer and also two thermoplastic resin layers of different relative crystallinities, and is characterized in that the thermoplastic resin layer 5 has a relative crystallinity greater than that of the thermoplastic resin layer 4. The relative crystallinities of these thermoplastic resin layers will be described in more detail below.

(Rectangular Conductor)

The size of the conductor is determined depending on application, and thus not particularly specified, but it is preferable that the rectangular conductor 2 has, in its cross section, a ratio of a short side to a long side (short side:long side) of 1:1 to 1:4. For example, the long side is preferably 1.0 mm to 5.0 mm, and more preferably 0.4 mm to 2.7 mm. The short side is preferably 0.4 mm to 3.0 mm, and more preferably, 0.5 mm to 2.5 mm. However, the range of conductor size with which an effect of the present disclosure can be obtained is not limited thereto. In the case of a conductor having a rectangular shape, a rectangular cross section is more common as compared to a square cross section, but the cross sectional shape also differs depending on the application. Further, such rectangular conductor 2 may be chamfered at four corners of a cross section of the conductor (radius of curvature r), and a smaller "r" is preferable for the purpose of increasing the fill ratio of the conductor in a stator slot, and a greater "r" is preferable for the purpose of suppressing partial discharge phenomenon due to electric field convergence at the four corners. Accordingly, the radius of curvature r is preferably 0.6 mm or less, and more preferably 0.2 mm to 0.4 mm. However, the range within which an effect of the present disclosure can be achieved is not limited thereto.

The rectangular conductor 2 is made of a metal having conductivity, and a material thereof may be any material having conductivity, and may be made of, for example, aluminum or aluminum alloy, or copper or copper alloy. In a case where the rectangular conductor 2 is made of aluminum alloy, the material may be a 1000 series alloy having a low strength but a high aluminum ratio or an Al—Mg—Si based alloy such as, for example, a 6101 alloy, which is a 6000 series aluminum alloy. Although aluminum or aluminum alloy has a conductivity of about two-thirds of the conductivity of copper or copper alloy, its specific gravity is about one-third thereof. Thus, a coil can be light weighted and can contribute to the light weighting of the vehicle and improvement in fuel consumption.

In a case where the rectangular conductor 2 is formed of copper or copper alloy, those used in conventional insulated wires may be used. However, preferably, those formed of low oxygen copper with an oxygen content of less than or equal to 30 ppm, and further preferably low oxygen copper with an oxygen content of less than or equal to 20 ppm or oxygen-free copper are used. With the oxygen content of less than or equal to 30 ppm, even if the conductor is caused to melt by heat for welding, voids due to contained oxygen do not occur at a welded portion and thus a decrease in electric resistance at the welded portion can be prevented, and strength at the welded portion can be maintained.

(Thermosetting Resin Layer)

The thermosetting resin layer 3 is a baked enamel layer formed by baking a resin varnish applied to the rectangular conductor 1 and has a thickness of 20 µm to 60 µm. Such baked enamel layer may be a single layer or a plurality of such baked enamel layers may be provided. For a case where two or more of such baked enamel layers are provided, each layer includes a resin as a major component and additives as a minor component, and the resin is the same as or different from that of other layers, and the additives are the same as or different from those of other layers. The baked enamel layer/layers may be formed directly on an outer peripheral surface of the rectangular conductor or via other layer having an insulating property.

In order to reduce the number of times the wire should pass through the baking furnace when forming an enamel layer and to prevent an adhesive force between a conductor and an adhesive layer from becoming extremely low, it is preferable that the enamel layer has a thickness of less than or equal to 60 µm, and further preferably less than or equal to 55 µm. Further, it is preferable that the enamel layer has a certain thickness, so as not to impair a withstand voltage property and a heat resistant property, which are properties necessary for an enameled wire to be used as the insulated wire. The thickness of the enamel layer should not be particularly limited as long as it is a thickness that does not produce pinholes, and preferably greater than or equal to 10 µm, and further preferably, greater than or equal to 20 µm.

The resin varnish includes a resin as its major component, and in terms of a heat resistance property, the resin is composed of, for example, one or more of polyamide-imide (PAI), polyesterimide, polyimide (PI), class H polyester (HPE) and polyetherimide (PEI), and particularly, polyamide-imide, polyimide or class H polyester is preferable. Class H polyester refers to polyester that is categorized into a heat-resistant class of class H.

The resin varnish includes an organic solvent that is used for making a thermosetting resin into a varnish. The organic solvent is not particularly limited as long as it does not inhibit the reaction of the thermosetting resin, and, for example, the organic solvent may be: amide solvents such as N-methyl-2-pyrrolidone (NMP), N,N-dimethylacetamide (DMAC), dimethylsulfoxide, and N,N-dimethylformamide; urea solvents such as N,N-dimethylethylene urea, N,N-dimethylpropylene urea, and tetramethylurea; lactone solvents such as γ-butyrolactone and γ-caprolactone; carbonate solvents such as propylene carbonate; ketone solvents such as methyl ethyl ketone, methyl isobutyl ketone, and cyclohexanone; ester solvents such as such as ethylacetate, n-butyl acetate, butyl cellosolve acetate, butyl carbitol acetate, ethyl cellosolve acetate, and ethyl carbitol acetate; glyme solvents such as diglyme, triglyme, and tetraglyme; hydrocarbon solvents such as toluene, xylene, and cyclohexane; and sulfone solvents such as sulfolane.

Among these organic solvents, amide solvents and urea solvents are preferable in terms of properties such as a high dissolving property and a high reaction accelerating property, and N-methyl-2-pyrrolidone, N,N-dimethylacetamide, N,N-dimethylethylene urea, N,N-dimethylpropylene urea, and tetramethylurea are more preferable since these do not have hydrogen atoms which are likely to inhibit crosslinking reactions by heating, and N-methyl-2-pyrrolidone is preferable.

Additives which are minor components of the resin varnish include, for example, antioxidant, antistatic agent, ultra-violet light inhibitor, light stabilizer, fluorescent whitening agent, pigment, dye, compatibilizer, lubricant, strengthening agent, flame retardant, crosslinking agent, crosslinking assistant, plasticizer, viscosity-increasing agent, viscosity-reducing agent and elastomer.

The resin varnish including components as described above may be, for example, applied to a rectangular conductor using a varnish-applying die having a shape similar to the shape of the conductor, and in a case where the cross-sectional shape of the conductor is quadrangular, the resin varnish may be applied using a die called "a universal die" having a cross sectional geometry in which two pairs of parallel lines are arranged perpendicular to each other. The conductor having the resin varnish applied thereon is baked in a baking furnace. For example, using a free convection-type vertical furnace having a length of approximately 5 m to 8 m, the process may be performed continuously at 400° C. to 500° C. with a passage time of 10 to 90 seconds.

Also, the adhesion strength at an inner portion of the thermosetting resin layer may be controlled by modifying the configuration and the type of films at an inner portion of the thermosetting resin layer.

(First Thermoplastic Resin Layer)

According to the first aspect, the thermoplastic resin layer 4 is a coating layer of crystalline resin having a thickness of 20 µm to 200 µm, specifically, an extruded coating layer that coats the baked enamel layer by extrusion. In terms of lowering a voltage at which partial discharge occurs and considering the chemical resistance, the extruded coating layer is preferably formed of a crystalline resin, and, for example, formed of polyetheretherketone (PEEK), polyetherketoneketone (PEKK), polyetherketone (PEK), polyphenylene sulfide (PPS) or thermoplasticity polyimide (PI).

It is preferable that the extruded coating layer has a thickness of less than or equal to 200 µm, and more preferably, less than or equal to 180 µm to achieve an effect of the present aspect. In case the thickness of the extruded coating layer is excessively large, a white colored portion may be produced at a surface of the insulated wire when the insulated wire is wound around an iron core and heated, independent of the rate of a film crystallinity of the extruded coating layer to be described below. As described above, if the extruded coating layer is excessively thick, the extruded coating layer itself has rigidity, and thus lacks flexibility as an insulated wire, and there is a possibility that a problem in maintaining an electrically insulating property before and after the processing may arise. On the other hand, in terms of preventing bad insulation, the thickness of the extruded coating layer is preferably greater than or equal to 10 µm, and more preferably, greater than or equal to 20 µm.

In a case where the thermoplastic resin layer 4 is formed by extrusion, it does not need to be passed through a baking furnace in the fabricating process, and thus the thickness of the insulating layer can be increased without increasing the thickness of an oxide film of the conductor.

Also, according to the present aspect, in order to quantitatively determine and evaluate the adhesion between the thermosetting resin layer 3 and thermoplastic resin layer 4, the adhesion strength at an interface between them is set to be within a range of 50 gf/mm to 100 gf/mm. Thereby, occurrence of a crack progressing from the thermoplastic resin layer to an outer surface of the rectangular conductor can be prevented. When the adhesion strength between the thermosetting resin layer 3 and the thermoplastic resin layer 4 is less than 50 gf/mm, peeling is likely to occur between the thermosetting resin layer and the thermoplastic resin layer when the rectangular insulated wire is bent, and when the adhesion strength exceeds 100 gf/mm, the aforementioned crack is likely to occur.

The adhesion strength can be controlled to be 50 gf/mm to 100 gf/mm by applying plasma treatment and corona treatment to an interface between the thermosetting resin layer 3 and the thermoplastic resin layer 4 or by making the crystallinity of the thermoplastic resin layer greater than or equal to 20% and less than or equal to 50%.

(Surface Treatment)

(Plasma Treatment)

Plasma treatment may be an atmospheric pressure plasma treatment method. Argon-oxygen mixed gas is used for creating plasma.

(Corona Treatment)

A corona processing device may employ a high frequency corona discharge treatment method. In general, an output power of 500 W and an output frequency of 20 kHz are used.

(Second Thermoplastic Resin Layer)

The thermoplastic resin layer 5 is an extruded coating layer that coats the thermoplastic resin layer 4 by extrusion. The thermoplastic resin layer 4 and the thermoplastic resin layer 5 form a double-layered configuration, and the total thickness of the thermoplastic resin layer 4 and the thermoplastic resin layer 5 is preferably less than or equal to 200 µm for an upper limit of the total thickness of the two layers and preferably greater than or equal to 20 µm for a lower limit thereof, for the similar reason as the reason of determining the thickness of the thermoplastic resin layer for the above-mentioned case in which the extruded coating layer has a single layered configuration. Therefore, it is desirable to determine the total thickness range of the two layers to be within the range of 20 µm to 200 µm. In terms of chemical resistance, it is preferable for the extruded coating layer to be made of a crystalline resin, and, for example, it is made of one of polyphenylene sulfide (PPS), polyetheretherketone (PEEK) or polyetherketone (PEK). It is desirable for thermoplastic resin layer 5 to be formed of a crystalline resin which is the same as the thermoplastic resin layer 4, but may be formed of a different crystalline resin.

Also, with the present aspect, the adhesion strength between the thermoplastic resin layer 4 and the thermoplastic resin layer 5 is within the range of 50 gf/mm to 100 gf/mm. Thereby, occurrence of a crack from the thermoplastic resin layer to an outer surface of the rectangular conductor can be prevented. In a case where the adhesion strength between the thermoplastic resin layer 4 and the thermoplastic resin layer 5 is less than 50 gf/mm, peeling is likely to occur between two thermoplastic resin layers during flexure of the rectangular insulated wire. In a case where the adhesion strength exceeds 100 gf/mm, the aforementioned crack is likely to occur. In a case where the thermoplastic resin layer 4 and the thermoplastic resin layer 5 are resin of the same type, or a combination of resins of similar structures of polyketones such as PEEK, PEKK and PEK, the adhesion strength becomes higher than the case in which the resins are of different types.

(Control of Relative Crystallinity of Thermoplastic Resin Layer)

According to the second aspect, since it is necessary to control the value of relative crystallinity, it is preferable to use a crystalline resin with which relative crystallinities of the first thermoplastic resin layer and the second thermoplastic resin layer can be controlled to be within the range of the present aspect.

(Control of Relative Crystallinity of First Thermoplastic Resin Layer)

According to the present aspect, in the thermoplastic resin layer 4, relative crystallinity calculated based on heat of fusion and heat of crystallization measured by differential scanning calorimetry (DSC) is greater than or equal to 20% and less than or equal to 50%. That is, the relative crystallinity in the present aspect is a relative ratio when the theoretically achievable maximum value of crystallinity is taken as 100%.

Here, the relative crystallinity is determined by an equation indicated below using data obtained by DSC measurement:

$$(\text{relative crystallinity})=\{(\text{heat of fusion}-\text{heat of crystallization})/(\text{heat of fusion})\}\times 100(\%),$$

where heat of fusion . . . fusion heat absorption value (J/g) during DSC measurement; and heat of crystallization . . . recrystallization calorific value (J/g) during DSC measurement.

With the relative crystallinity of the thermoplastic resin layer 4 based on the DSC measurement being a value within the above-mentioned range, the adhesion strength between the thermosetting resin layer 3 and the thermoplastic resin layer 4 can be suppressed from increasing more than required, and while maintaining adhesion between the thermosetting resin layer 3 and the thermoplastic resin layer 4, occurrence of a crack extending from an outer surface of thermoplastic resin layer 4 to an outer surface of the rectangular conductor 2 can be prevented. In a case where the relative crystallinity exceeds 50%, adhesion between the thermosetting resin layer 3 and the thermoplastic resin layer 4 decreases, and peeling is more likely occur between the layers. Here, the adhesion strength between the thermosetting resin layer 3 and the thermoplastic resin layer 4 is 50 gf/mm to 100 gf/mm. Note that, because of the manufacturing method, even if time taken until water cooling is shortened as much as possible, a wire having a relative crystallinity of less than 20% cannot be manufactured.

(Control of Relative Crystallinity of Second Thermoplastic Resin Layer)

The relative crystallinity of the second thermoplastic resin layer is almost the same as the relative crystallinity of the first thermoplastic resin layer, or greater than the relative crystallinity of the first thermoplastic resin layer. The reason for this is to improve scratch resistance and ATF-resistant property while maintaining the adhesion of the first thermoplastic resin layer and the second thermoplastic resin layer.

The relative crystallinity of the thermoplastic resin layer 5 based on the DSC measurement is substantially the same or different from the relative crystallinity of the thermoplastic resin layer 4. Specifically, the relative crystallinity of thermoplastic resin layer 5 is 45% to 100% and within a range of −5% to 60% with respect to the relative crystallinity of the thermoplastic resin layer 4. Preferably, the relative crystallinity of the thermoplastic resin layer 5 is the same as or higher than the relative crystallinity of the thermoplastic resin layer. With such relative crystallinity, in a case where thermoplastic resin layer 5 and the thermoplastic resin layer 4 are resins of the same type or resins having similar structures, even if the crystallinity of the thermoplastic resin layer 5 is somewhat high, an adhesion strength in the range of 50 gf/mm to 100 gf/mm can be obtained between the thermoplastic resin layer 5 and the thermoplastic resin layer 4.

In a case where the relative crystallinity of the thermoplastic resin layer 5 is higher than the relative crystallinity of the thermoplastic resin layer 4, there is a concern on characteristics such as flexibility and resistance to thermal softening, but since the relative crystallinity of the thermoplastic resin layer 4 is greater than or equal to 20% and less than or equal to 50%, flexibility and resistance to thermal softening of the rectangular insulated wire 1 can be almost maintained. Thus, by providing the thermoplastic resin layer 5 on the thermoplastic resin layer 4, chemical resistance, particularly ATF-resistant property, can be further improved while suppressing an occurrence of partial discharge, and scratch resistance can also be improved.

The rectangular insulated wire according to the first embodiment and the rectangular insulated wire according to the second embodiment are described above. However, the present aspects are not limited to embodiments described above, and various alterations and modifications are possible based on the technical idea of the present aspects.

For example, in the aforementioned embodiments, two thermoplastic resin layers are provided, but, it is not limited thereto, and may be configured such that a single layer of thermoplastic resin layer is provided on the thermosetting resin layer, and the relative crystallinity in the vicinity of an interface between the thermoplastic resin layer and the thermosetting resin layer is greater than or equal to 20% and less than or equal to 50%.

Also, in the above-mentioned embodiments, a rectangular insulated wire which is obtained by coating a rectangular conductor was described by way of example, but it is not limited thereto, and may be a round insulated wire that is obtained by coating a conductor having a substantially round shaped cross section.

For example, in order to obtain a resin having a relative crystallinity in the range of 20% to 50%, after coating by extrusion and until water cooling, a rectangular winding is held in air at ordinary temperature for 1 to 4 seconds; in order to obtain a resin having a relative crystallinity in the range of from 70% to 90%, after coating by extrusion and until water cooling, the rectangular insulated wire is held in air at ordinary temperature for 6 to 7 seconds; and in order to obtain a resin having a relative crystallinity of over 90% and up to 100%, after coating by extrusion until water cooling, the rectangular insulated wire is held in air at ordinary temperature for 8 to 10 seconds.

EXAMPLES

The present disclosure will be described in detail based on the following examples. The present disclosure is not limited to examples indicated below.

(Case in which a Single Layer of Thermoplastic Resin Layer is Provided)

Example 1

First, an example in which a single extruded coating layer (thermoplastic resin layer) is provided will be described. A rectangular conductor (copper with an oxygen content of 15 ppm) having thickness 1.8×width 2.5 mm and chamfered at four corners with a radius r=0.5 mm was prepared. As a thermosetting resin, polyamide-imide resin varnish (manufactured by Hitachi Chemical Company Ltd., product name "HPC-9000") was used, and the resin was coated on the conductor using a die having a geometry similar to the shape of the conductor. The coated conductor was caused to pass through a baking furnace set at 450° C. and having a furnace length of 8 m with a speed such that baking time is 15 seconds, to thus form an enamel layer of thickness 5 μm by this single baking step. By repeating this step for four times, an enamel layer of thickness 20 μm was formed and an enameled wire (thermosetting resin layer) having a coating thickness of 20 μm was obtained.

The obtained enameled wire was used as a core wire, and a screw of an extruder was 30 mm full flight, L/D=20, and a compression ratio 3. Then, as a thermoplastic resin, PEEK (product made by Victrex Japan Inc., product name "PEEK450G") was used. In order to form an extruded coating layer having a relative crystallinity of 45%, after having performed extrusion coating of PEEK using an extruding die, water cooling was performed after a time interval of three seconds to form an extruded coating layer (extruded coating layer 1) having a thickness of 20 μm outside the enamel layer. In this manner, an insulated wire comprising the PEEK extrusion coated enameled wire having a total thickness (total of the thickness of an enamel layer and the extrusion coating resin layer) of 40 μm was obtained.

Example 2

Except that the enamel layer is modified to have a thickness of 30 μm and the extruded coating layer is modified to have a relative crystallinity of 25% and a thickness of 45 μm, an insulated wire was manufactured by a method similar to the method of Example 1.

Example 3

Except that the enamel layer is modified to have a thickness of 60 μm and the extruded coating layer is modified to have a relative crystallinity of 40% and a thickness of 53 μm, an insulated wire was manufactured by a method similar to the method of Example 1.

Example 4

Except that the enamel layer is modified to have a thickness of 50 μm and the extruded coating layer is modified to employ PEKK (product made by Arkema Japan, product name "Super Engineering Plastics PEKK") as the resin and to have a relative crystallinity of 42% and a thickness of 30 μm, an insulated wire was manufactured by a method similar to the method of Example 1.

Example 5

Except that the enamel layer is modified to have a thickness of 50 μm and the extruded coating layer is modified to employ PPS (manufactured by Polyplastics Co., Ltd, product name "FORTRON 0220A9") as the resin and to have a relative crystallinity of 45% and a thickness of 80 μm, an insulated wire was manufactured by a method similar to the method of Example 1.

Example 6

Except that the enamel layer is modified to have a thickness of 60 μm and the extruded coating layer is modified to have a relative crystallinity of 50% and a thickness of 75 μm, an insulated wire was manufactured by a method similar to the method of Example 1.

Example 7

Except that the enamel layer is modified to have a thickness of 50 μm and the extruded coating layer is modified to employ thermoplastic PI (manufactured by Mitsui Chemicals, Inc., product name "AURUM PL450C") as the resin and to have a relative crystallinity of 50% and a thickness of 80 μm, an insulated wire was manufactured by a method similar to the method of Example 1.

Example 8

Except that the enamel layer is modified to have a thickness of 55 μm and the extruded coating layer is modified to have a relative crystallinity of 45% and a thickness of 75 μm, an insulated wire was manufactured by a method similar to the method of Example 1.

Example 9

Except that the enamel layer is modified to employ PI as the resin and to have a thickness of 50 μm and the extruded coating layer is modified to have a relative crystallinity of 45% and a thickness of 50 μm, an insulated wire was manufactured by a method similar to the method of Example 1.

Example 10

Except that the enamel layer is modified to employ HPE (manufactured by Totoku Toryo Co., Ltd., product name "Neoheat 8200") as the resin and to have a thickness of 40 μm and the extruded coating layer is modified to employ PEKK as the resin and to have a relative crystallinity of 25% and a thickness of 65 μm, an insulated wire was manufactured by a method similar to the method of Example 1.

Example 11

Except that the enamel layer is modified to have a thickness of 20 μm and the extruded coating layer is modified to employ PEKK as the resin and to have a relative crystallinity of 45% and a thickness of 125 μm, an insulated wire was manufactured by a method similar to the method of Example 1.

Example 12

Except that the enamel layer is modified to have a thickness of 50 μm and the extruded coating layer is modified to have a relative crystallinity of 50% and a thickness of 145 μm, an insulated wire was manufactured by a method similar to the method of Example 1.

Example 13

Except that the enamel layer is modified to have a thickness of 20 μm and the extruded coating layer is modified to have a relative crystallinity of 45% and a thickness of 180 μm, an insulated wire was manufactured by a method similar to the method of Example 1.

Example 14

Except that the enamel layer is modified to have a thickness of 50 μm and the extruded coating layer is modified to have a relative crystallinity of 42% and a thickness of 195 μm, an insulated wire was manufactured by a method similar to the method of Example 1.

Comparative Example 1

Except that the enamel layer is modified to have a thickness of 40 μm and the extruded coating layer is modified to employ PEI (manufactured by SABIC Innovative Plastics Japan LLC, product name "ULTEM 1000") as the resin and to have a thickness of 10 μm, an insulated wire was manufactured by a method similar to the method of Example 1.

Comparative Example 2

Except that the enamel layer is modified to have a thickness of 35 μm and the extruded coating layer is modified to have a relative crystallinity of 80% and a thickness of 75 μm, an insulated wire was manufactured by a method similar to the method of Example 1. In order to provide an extruded resin layer having a relative crystallinity of 80%, after having performed extrusion coating of the PEEK using an extruding die, water cooling was performed after a time interval of six seconds to form an extruded coating resin layer having a thickness of 75 μm outside the enamel layer.

Comparative Example 3

Except that the enamel layer is modified to have a thickness of 45 μm and the extruded coating layer is not provided, an insulated wire was manufactured by a method similar to the method of Example 1.

(Case in which Two Thermoplastic Resin Layers are Provided)

Example 15

Next, an example of providing two or three layers of extruded coating layers will be described. The same materials and method as Example 1 are used for manufacturing until the first extruded coating layer (extruded coating layer 1) is formed, and thereafter, as a second extruded coating layer, PEEK is used, and in order to provide an extruded resin layer having a relative crystallinity of 100%, after having performed extrusion coating of the PEEK using an extruding die, water cooling was performed after a time interval of eight seconds to form an extruded coating layer (extruded coating layer 2) having a thickness of 20 μm outside the first extruded coating layer. In this manner, an insulated wire made of an extruded coating enameled wire having a total thickness of (a sum of the thickness of the enamel layer and the two extruded coating resin layer) 60 μm was obtained.

Example 16

Except that the manufacturing was carried out using the same materials and method as Example 2 until the first extruded coating layer is formed, and further, the second extruded coating layer is modified to have a relative crystallinity of 95% and a thickness of 40 μm, an insulated wire was obtained by forming the second extruded coating layer similarly to Example 15.

Example 17

Except that the manufacturing was carried out using the same materials and method as Example 3 until the first extruded coating layer is formed, and further, the second extruded coating layer is modified to have a relative crystallinity of 100% and a thickness of 45 μm, an insulated wire was obtained by forming the second extruded coating layer similarly to Example 15.

Example 18

Except that the manufacturing was carried out using the same materials and method as Example 4 until the first extruded coating layer is formed, and further, the second extruded coating layer is modified to have a relative crystallinity of 85% and a thickness of 38 μm, an insulated wire was obtained by forming the second extruded coating layer similarly to Example 15.

Example 19

Except that the manufacturing was carried out using the same materials and method as Example 5 until the first extruded coating layer is formed, and further, the second extruded coating layer is modified to have a relative crystallinity of 50% and a thickness of 50 μm, an insulated wire was obtained by forming the second extruded coating layer similarly to Example 15.

Example 20

Except that the manufacturing was carried out using the same materials and method as Example 6 until the first extruded coating layer is formed, and further, the second extruded coating layer is modified to have a relative crystallinity of 45% and a thickness of 50 μm, an insulated wire was obtained by forming the second extruded coating layer similarly to Example 15.

Example 21

Except that the manufacturing was carried out using the same materials and method as Example 7 until the first extruded coating layer is formed, and further, the second extruded coating layer is modified to have a relative crystallinity of 70% and a thickness of 50 μm, an insulated wire was obtained by forming the second extruded coating layer similarly to Example 15.

Example 22

Except that the manufacturing was carried out using the same materials and method as Example 8 until the first extruded coating layer is formed, and further, the second extruded coating layer is modified to employ PEK and to have a relative crystallinity of 85% and a thickness of 55 μm, an insulated wire was obtained by forming the second extruded coating layer similarly to Example 15.

Example 23

Except that the manufacturing was carried out using the same materials and method as Example 9 until the first extruded coating layer is formed, and further, the second extruded coating layer is modified to have a relative crystallinity of 90% and a thickness of 60 μm, an insulated wire was obtained by forming the second extruded coating layer similarly to Example 15.

Example 24

Except that the manufacturing was carried out using the same materials and method as Example 10 until the first extruded coating layer is formed, and further, the second extruded coating layer is modified to have a relative crystallinity of 83% and a thickness of 65 μm, an insulated wire was obtained by forming the second extruded coating layer similarly to Example 15.

Example 25

Except that the thickness of the first extruded coating layer is changed from 125 μm to 80 μm, the manufacturing was carried out using the same materials and method as Example 11, and further, the second extruded coating layer is modified to have a relative crystallinity of 90% and a thickness of 85 μm, an insulated wire was obtained by forming the second extruded coating layer similarly to Example 15.

Example 26

Except that the thickness of the first extruded coating layer is changed from 145 μm to 80 μm and the relative crystallinity is changed from 50% to 45%, the manufacturing was carried out using the same materials and method as Example 12, and further, the second extruded coating layer is modified to employ thermoplastic PI as the resin, and to have a relative crystallinity of 75% and a thickness of 80 μm, an insulated wire was obtained by forming the second extruded coating layer similarly to Example 15.

Example 27

Except that the thickness of the enameled layer is changed from 20 μm to 50 μm and the first extruded coating layer is modified to employ PEKK as the resin and to have a relative crystallinity of 42%, and the thickness is changed from 180 μm to 85 μm, the manufacturing was carried out using the same materials and method as Example 13, and further, the second extruded coating layer is modified to have a relative crystallinity of 90% and a thickness of 80 μm, an insulated wire was obtained by forming the second extruded coating layer similarly to Example 15.

Example 28

Except that the first extruded coating layer is modified to employ PEEK as the resin and the relative crystallinity is changed from 42% to 45%, and the thickness is changed from 195 μm to 80 μm, the manufacturing was carried out using the same materials and method as Example 14, and further, the second extruded coating layer is modified to employ PPS as the resin and to have a relative crystallinity of 50% and a thickness of 85 μm, an insulated wire was obtained by forming the second extruded coating layer similarly to Example 15.

Example 29

Except that the enameled layer is modified to have a thickness of 20 μm, the first extruded coating layer is modified to have a thickness of 95 μm, and the second extruded coating layer is modified to have a relative crystallinity of 90% and a thickness of 95 μm, an insulated wire was obtained by forming the second extruded coating layer similarly to Example 18.

Example 30

Except that the first extruded coating layer is modified to have a thickness of 105 μm, and the second extruded coating layer is modified to have a relative crystallinity of 45% and a thickness of 85 μm, an insulated wire was obtained by forming the second extruded coating layer similarly to Example 18.

Example 31

Except that the second extruded coating layer is modified to have a relative crystallinity of 90% and a thickness of 90 μm, an insulated wire was obtained by forming the second extruded coating layer similarly to Example 30.

Example 32

Except that the enameled layer is modified to have a thickness of 40 μm and the second extruded coating layer is modified to have a relative crystallinity of 80% and a thickness of 70 μm, the second extruded coating layer (extruded coating layer 2) was formed with the same materials and method as Example 22, and thereafter, as a third extruded coating layer, PEEK is used, and in order to form an extruded resin layer having a relative crystallinity of 90%, after having performed extrusion coating of the PEEK using an extruding die, water cooling was performed after a time interval of five seconds to form an extruded coating layer (extruded coating layer 3) having a thickness of 60 μm outside the second extruded coating layer. In this manner, an insulated wire having a total thickness of (a sum of the thickness of the enameled wire and the three extruded coating resin layer) 245 μm was obtained.

Comparative Example 4

Except that the enameled layer is modified to have a thickness of 40 μm, the first extruded coating layer is modified to employ PEI as the resin and to have a thickness of 10 μm, and, the second extruded coating layer is modified to have a relative crystallinity of 95% and a thickness of 100 μm, an insulated wire was obtained by forming the second extruded coating layer similarly to Example 15.

Comparative Example 5

Except that the enameled layer is modified to have a thickness of 35 μm, the first extruded coating layer is modified to have a relative crystallinity of 80% and a thickness of 75 μm, and, the second extruded coating layer is modified to have a relative crystallinity of 90% and a thickness of 80 μm, an insulated wire was obtained by forming the second extruded coating layer similarly to Example 15.

Comparative Example 6

Except that the enameled layer is modified to have a thickness of 40 μm, the first extruded coating layer is modified to employ PES (manufactured by Sumitomo Chemical Co., Ltd., product name "SUMIKAEXCEL 4100G") as the resin and to have a thickness of 50 μm, and, the second extruded coating layer is modified to employ a polymer alloy of PES and PEEK (weight ratio 70:30) as the resin and to have a relative crystallinity of 65% and a thickness of 50 μm, an insulated wire was obtained by forming the second extruded coating layer similarly to Example 15.

Hereinafter, a method of measuring the relative crystallinity, the adhesion strengths between the thermosetting resin layer and the extruded coating layer and between the extruded coating layers, presence or absence of a crack reaching the conductor, presence or absence of the peeling between the thermosetting resin layer and the extruded coating layer and between the extruded coating layers, and a method of measuring an ATF-resistant property will be described.

(1) Adhesion Strengths Between Thermosetting Resin Layer and Extruded Coating Layer and Between Extruded Coating Layers First, an electric wire sample from which only the extruded coating layer of the insulated wire is partly peeled was set to a tensile testing machine (manufactured by Shimadzu Corporation, device name "Autograph AG-X"), and the extruded coating layer was peeled off upwardly at a rate of 4 mm/min (180 degrees peeling). The tensile load thus read was taken as the adhesion strength.

(2) Method of Measuring Relative Crystallinity

The film crystallinity of the extruded coating resin layer of the present disclosure was measured as follows by differential scanning calorimetry (DSC) using a thermal analysis device (manufactured by Shimadzu Corporation, device name "DSC-60"). That is, 10 mg of the film of the extruded coating resin layer was collected and the temperature was raised at a rate of 5° C./min. Here, a heating value (heat of fusion) due to fusion observed in region around 300° C. and heating value (heat of crystallization) due to crystallization observed around 150° C. were calculated and a value obtained by subtracting the heat of crystallization from the heat of fusion to the heat of fusion and by dividing the thus obtained difference by the heat of fusion was taken as the film crystallinity.

(3) Crack Reaching the Conductor

The insulated wire was cut into a 300 mm straight piece, and a scratch having a depth of approximately 10 μm was made at a central portion of the wire in a direction perpendicular to the longitudinal direction of the wire using a special jig. Then, placing the scratch at a peak, it was bent through 180° about a 1.0 mm iron core. Thereafter, presence or absence of a crack occurring near the peak was visually observed.

(4) Peeling Between a Thermosetting Resin Layer and Extruded Coating Layer or Between Extruded Coating Layers The insulated wire was cut into a 300 mm straight piece, and bent through 180° about a 1.0 mm iron core. Thereafter, presence or absence of a crack occurring between respective layers near the peak was visually observed.

(5) ATF-Resistant Property

The insulated wire was cut into a 300 mm straight piece, and placed in a sealed container made of SUS. 1,300 g ATF oil and 6.5 ml water (equivalent to 0.5% by weight) were placed into the container, and, were heated together with the sealed container made of SUS at 150° for 500 hours. After heat treatment, the insulated wire was removed and left until it reached an ordinary temperature. After reaching an ordinary temperature, it was bent through 180° about a 1.0 mm iron core. The sample subjected to the bending process was evaluated, and determined as a pass "○" if no crack extending from the extruded coating layer to the conductor has occurred, and determined as a fail "x" if a crack has occurred.

(Test Results for the Case of Single Thermoplastic Resin Layer)

As test results for a case where a single layer of thermoplastic resin layer is provided, Table 1 (Tables 1-1 and 1-2) shows results of measurements and evaluations using the aforementioned method for Examples 1 to 14 and Comparative Examples 1 to 3.

TABLE 1

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| Thermosetting resin layer | PAI | PAI | PAI | PAI | PAI | PAI | PAI | PAI | PI | HPE |
| [Thickness: um] | 20 | 30 | 60 | 50 | 50 | 60 | 50 | 55 | 50 | 40 |
| Extruded coating layer | PEEK | PEEK | PEEK | PEKK | PPS | PEEK | Thermoplastic PI | PEEK | PEEK | PEKK |
| [Relative crystallinity: %] | 45 | 25 | 40 | 42 | 45 | 50 | 50 | 45 | 45 | 25 |
| [Thickness: um] | 20 | 45 | 53 | 30 | 80 | 75 | 80 | 75 | 50 | 65 |
| Adhesion strength between thermosetting resin layer and extruded coating layer | 60 | 63 | 70 | 70 | 55 | 70 | 60 | 65 | 60 | 65 |
| Crack reaching conductor | NO | NO | NO | NO | NO | NO | NO | NO | NO | NO |
| Peeling between thermosetting resin layer/extruded coating layer | NO | NO | NO | NO | NO | NO | NO | NO | NO | NO |
| ATF-resistant property | PASS | PASS | PASS | PASS | PASS | PASS | PASS | PASS | PASS | PASS |

|  | EXAMPLE 11 | EXAMPLE 12 | EXAMPLE 13 | EXAMPLE 14 | COMPARATIVE EXAMPLE 1 | COMPARATIVE EXAMPLE 2 | COMPARATIVE EXAMPLE 3 |
|---|---|---|---|---|---|---|---|
| Thermosetting resin layer | PAI | PAI | PAI | PAI | PAI | PAI | PAI |
| [Thickness: um] | 20 | 50 | 20 | 50 | 40 | 35 | 45 |
| Extruded coating layer | PEKK | PEEK | PEEK | PEKK | PEI | PEEK | — |
| [Relative crystallinity: %] | 45 | 50 | 45 | 42 | — | 80 | — |
| [Thickness: um] | 125 | 145 | 180 | 195 | 10 | 75 | — |
| Adhesion strength between thermosetting resin layer and extruded coating layer | 65 | 70 | 70 | 75 | 115 | 40 | — |
| Crack reaching conductor | NO | NO | NO | NO | YES | NO | — |
| Peeling between thermosetting resin layer/extruded coating layer | NO | NO | NO | NO | NO | YES | — |
| ATF-resistant property | PASS | PASS | PASS | PASS | PASS | PASS | FAIL |

From the results indicated in Table 1 (Tables 1-1 and 1-2), it can be seen that in a case where a single layer of extruded coating layer is provided on an enameled wire, with the adhesion strength between the thermosetting resin layer and the extruded coating layer being 55 gf/mm to 75 gf/mm (Examples 1 to 14), a crack extending from the extruded coating layer and reaching the conductor did not occur, peeling between the thermosetting resin layer and the extruded coating layer did not occur and the flex resistance reliability was high. In addition, it was found that the ATF-resistant property was good.

Similarly, it can be considered that a configuration in which the extruded coating layer for this case has a relative crystallinity of 30% to 50% and in which the extruded coating layer is controlled to have a relative crystallinity in the above range results in the aforementioned results in which the flex resistance reliability and ATF resistant property are excellent. As the relative crystallinity in the resin increases, an increase in adhesion can be suppressed, and it can be considered that the reason for this is that, by increasing an amount of crystalline portions, they are intertwined with each other and an amount of amorphous portions that increases adhesion can be decreased, and as a result, that the adhesion can be controlled to be within a predetermined range.

On the other hand, in Comparative Example 1, in which the resin of the extruded coating layer was PEI, the adhesion strength between the thermosetting resin layer and the extruded coating layer was 115 gf/mm and a crack extending from the extruded coating layer and reaching the conductor occurred. In Comparative Example 2, in which the extruded coating layer had a relative crystallinity of 80%, the adhesion strength between the thermosetting resin layer and the extruded coating layer was 40 gf/mm and peeling occurred between the thermosetting resin layer and the extruded coating layer. In Comparative Example 3, the extruded coating layer was not provided on the enameled wire, and an ATF-resistant property was poor.

(Test Results for the Case of Two Thermoplastic Resin Layers)

As test results for a case where two layers of thermoplastic resin layer are provided, Table 2 (Tables 2-1 and 2-2) shows results of measurements and evaluations using the aforementioned method for Examples 15 to 32 and Comparative Examples 4 to 6.

TABLE 2

|  | EXAMPLE 15 | EXAMPLE 16 | EXAMPLE 17 | EXAMPLE 18 | EXAMPLE 19 | EXAMPLE 20 | EXAMPLE 21 | EXAMPLE 22 | EXAMPLE 23 | EXAMPLE 24 | EXAMPLE 25 |
|---|---|---|---|---|---|---|---|---|---|---|---|
| Thermosetting resin layer | PAI | PAI | PAI | PAI | PAI | PAI | PAI | PAI | PI | HPE | PAI |
| [Thickness: um] | 20 | 30 | 60 | 50 | 50 | 60 | 50 | 55 | 50 | 40 | 20 |
| Extruded coating layer 1 | PEEK | PEEK | PEEK | PEKK | PPS | PEEK | Thermoplastic PI | PEEK | PEEK | PEKK | PEKK |
| [Relative crystallinity: %] | 45 | 25 | 40 | 42 | 45 | 50 | 50 | 45 | 45 | 25 | 45 |
| [Thickness: um] | 20 | 45 | 53 | 30 | 80 | 75 | 80 | 75 | 50 | 65 | 80 |
| Extruded coating layer 2 | PEEK | PEEK | PEEK | PEEK | PEEK | PEEK | PEEK | PEK | PEEK | PEEK | PEEK |
| [Relative crystallinity: %] | 100 | 95 | 100 | 85 | 50 | 45 | 70 | 85 | 90 | 83 | 90 |
| [Thickness: um] | 20 | 40 | 45 | 38 | 50 | 50 | 50 | 55 | 60 | 65 | 85 |

TABLE 2-continued

| | | | | | | | | | | |
|---|---|---|---|---|---|---|---|---|---|---|
| Extruded coating layer 3 | — | — | — | — | — | — | — | — | — | — | — |
| [Relative crystallinity: %] | — | — | — | — | — | — | — | — | — | — | — |
| [Thickness: um] | — | — | — | — | — | — | — | — | — | — | — |
| Adhesion strength between thermosetting resin layer and extruded coating layer | 60 | 63 | 70 | 70 | 55 | 70 | 60 | 65 | 60 | 65 | 70 |
| Adhesion strength between extruded coating layers | 80 | 80 | 85 | 85 | 65 | 90 | 70 | 80 | 80 | 80 | 85 |
| Crack reaching conductor | NO | NO | NO | NO | NO | NO | NO | NO | NO | NO | NO |
| Peeling between thermosetting resin layer and extruded coating layer or between extruded coating layers | NO | NO | NO | NO | NO | NO | NO | NO | NO | NO | NO |
| ATF-resistant property | PASS | PASS | PASS | PASS | PASS | PASS | PASS | PASS | PASS | PASS | PASS |

| | EXAMPLE 26 | EXAMPLE 27 | EXAMPLE 28 | EXAMPLE 29 | EXAMPLE 30 | EXAMPLE 31 | EXAMPLE 32 | COMPARATIVE EXAMPLE 4 | COMPARATIVE EXAMPLE 5 | COMPARATIVE EXAMPLE 6 |
|---|---|---|---|---|---|---|---|---|---|---|
| Thermosetting resin layer | PAI | PAI | PAI | PAI | PAI | PAI | PAI | PAI | PAI | PAI |
| [Thickness: um] | 50 | 50 | 50 | 20 | 50 | 50 | 40 | 40 | 35 | 40 |
| Extruded coating layer 1 | PEEK | PEKK | PEEK | PEKK | PEKK | PEKK | PEEK | PEI | PEEK | PES |
| [Relative crystallinity: %] | 45 | 42 | 45 | 42 | 42 | 42 | 45 | — | 80 | — |
| [Thickness: um] | 80 | 85 | 80 | 95 | 105 | 105 | 75 | 10 | 75 | 50 |
| Extruded coating layer 2 | Thermoplastic PI | PEEK | PPS | PEEK | PEEK | PEEK | PEK | PEEK | PEEK | PES + PEEK (70:30) |
| [Relative crystallinity: %] | 75 | 90 | 50 | 90 | 45 | 90 | 80 | 95 | 90 | 65 |
| [Thickness: um] | 80 | 80 | 85 | 95 | 85 | 90 | 70 | 100 | 80 | 50 |
| Extruded coating layer 3 | — | — | — | — | — | — | PEEK | — | — | — |
| [Relative crystallinity: %] | — | — | — | — | — | — | 90 | — | — | — |
| [Thickness: um] | — | — | — | — | — | — | 60 | — | — | — |
| Adhesion strength between thermosetting resin layer and extruded coating layer | 75 | 75 | 75 | 70 | 75 | 75 | 60 | 115 | 40 | 70 |
| Adhesion strength between extruded coating layers | 75 | 85 | 65 | 80 | 90 | 80 | 80 / 85 | 300 or higher | 85 | 150 |
| Crack reaching conductor | NO | NO | NO | NO | NO | NO | NO | YES | NO | YES |
| Peeling between thermosetting resin layer and extruded coating layer or between extruded coating layers | NO | NO | NO | NO | NO | NO | NO / NO | NO | YES | NO |
| ATF-resistant property | PASS | PASS | PASS | PASS | PASS | PASS | PASS | PASS | PASS | FAIL |

From the results indicated in Table 2 (Tables 2-1 and 2-2), it can be seen that in a case where two layers of extruded coating layers are provided on an enameled wire, with the adhesion strength between the thermosetting resin layer and the first extruded coating layer being 55 gf/mm to 75 gf/mm and the adhesion strength between the first extruded coating layer and the second extruded coating layer being 75 gf/mm to 90 gf/mm (Examples 15 to 31), a crack extending from the second extruded coating layer and reaching the conductor did not occur, peeling occurs neither between the thermosetting resin layer and the extruded coating layer nor between the first extruded coating layer and the second extruded coating layer and the flex resistance reliability was high. In addition, it was found that the ATF-resistant property was good.

Similarly, from Table 2 (Tables 2-1 and 2-2), it can be seen that, with the first extruded coating layer having a relative crystallinity of 30% to 50% and the second extruded coating layer having a relative crystallinity of 45% to 100%, peeling occurs neither between the thermosetting resin layer and the extruded coating layer nor between the first extruded coating layer and the second extruded coating layer, and the flex resistance reliability was high, and the ATF-resistant property was also good.

Further, in a case where three layers of extruded coating layers are provided on the enameled wire, it can be seen that with the adhesion strength between the thermosetting resin layer and the extruded coating layer being 60 gf/mm, and the adhesion strengths between the first and second extruded coating layers and between the second and third extruded coating layers being 80 gf/mm and 85 gf/mm, respectively, (Example 32), neither a crack extending from the third extruded coating layer to the conductor nor peeling between the thermosetting resin layer and the extruded coating layer, between first and second extruded coating layers and between the second and third extruded coating layers occurred, and in addition, the ATF-resistant property was good. Here, the first extruded coating layer has a relative crystallinity of 45%, the second extruded coating layer has a relative crystallinity of 80%, and the third level extruded coating layer has a relative crystallinity of 90%, and it can be seen that a control over the crystallinity for each layer of the triple-layer structure gives rise to the aforementioned results.

On the other hand, in Comparative Example 4, the adhesion strength between the thermosetting resin layer and the extruded coating layer was 115 gf/mm and the adhesion strength between the first extruded coating layer and the second extruded coating layer was greater than or equal to 300 gf/mm, and a crack extending from the second extruded coating layer and reaching the conductor occurred. In Comparative Example 5, the relative crystallinity of the first extruded coating layer was 80%, and, the adhesion strength between the thermosetting resin layer and the extruded coating layer was 40 gf/mm, and peeling occurred between the thermosetting resin layer and the extruded coating layer.

In Comparative Example 6, the resin of first extruded coating layer was PES and the resin of the second extruded coating layer was a polymer alloy of PES and PEEK, and the adhesion strength between the first extruded coating layer and the second extruded coating layer was 150 gf/mm, and a crack extending from the second extruded coating layer and reaching the conductor occurred, and, the ATF-resistant property was also poor.

The rectangular insulated wire of the present disclosure is preferably used as a magnet wire for motor coils installed in EV (electric vehicles) or HV (hybrid vehicles).

What is claimed is:

1. A rectangular insulated wire comprising:
    a rectangular conductor having a generally rectangular cross section;
    a thermosetting resin layer provided to cover the rectangular conductor,
    a first thermoplastic resin layer provided on the thermosetting resin layer;
    a second thermoplastic resin layer provided on the first thermoplastic resin layer,
    an adhesion strength between the thermosetting resin layer and the first thermoplastic resin layer being 50 gf/mm to 100 gf/mm,
    a relative crystallinity of the first thermoplastic resin layer being greater than or equal to 20% and less than or equal to 50%,
    a relative crystallinity of the second thermoplastic resin layer being higher than the relative crystallinity of the first thermoplastic resin layer by greater than or equal to 3%.

2. The rectangular insulated wire according to claim 1, wherein the first thermoplastic resin layer is a crystalline resin layer formed of any of materials selected from the group comprising polyetheretherketone, polyetherketoneketone, polyetherketone, polyphenylene sulfide and thermoplastic polyimide.

3. The rectangular insulated wire according to claim 1, wherein an adhesion strength between the first thermoplastic resin layer and the second thermoplastic resin layer is 50 gf/mm to 100 gf/mm.

4. The rectangular insulated wire according to claim 1, wherein the relative crystallinity of the second thermoplastic resin layer is 45% to 100%.

5. The rectangular insulated wire according to claim 1, wherein the second thermoplastic resin layer is a second crystalline resin layer formed of any material selected from the group comprising polyetheretherketone, polyetherketoneketone, polyetherketone, polyphenylene sulfide and thermoplastic polyimide.

6. The rectangular insulated wire according to claim 1, wherein the thermosetting resin layer is formed of one or a plurality of materials selected from the group comprising polyamide-imide, polyesterimide, polyimide, class H polyester and polyetherimide.

7. The rectangular insulated wire according to claim 1, wherein the thermosetting resin layer is formed on the rectangular conductor by bake-on coating.

8. The rectangular insulated wire according to claim 1, wherein the first thermoplastic resin layer is formed on the thermosetting resin layer by extrusion, and further the second thermoplastic resin layer is formed on the first thermoplastic resin layer by extrusion.

9. The rectangular insulated wire according to claim 1, wherein the rectangular conductor is one of aluminum or aluminum alloy and copper or copper alloy.

10. An electric generator coil formed by winding a rectangular insulated wire comprising:
    a rectangular conductor having a generally rectangular cross section;
    a thermosetting resin layer provided to cover the rectangular conductor,
    a first thermoplastic resin layer provided on the thermosetting resin layer;
    and a second thermoplastic resin layer provided on the first thermoplastic resin layer,
    an adhesion strength between the thermosetting resin layer and the first thermoplastic resin layer being 50 gf/mm to 100 gf/mm,
    a relative crystallinity of the first thermoplastic resin layer being greater than or equal to 20% and less than or equal to 50%,
    a relative crystallinity of the second thermoplastic resin layer being higher than the relative crystallinity of the first thermoplastic resin layer by greater than or equal to 3%.

* * * * *